United States Patent [19]

Miller et al.

[11] 4,050,844
[45] Sept. 27, 1977

[54] CONNECTION BETWEEN VANE ARM AND UNISON RING IN VARIABLE AREA STATOR RING

[75] Inventors: Guy W. Miller, Vernon; James R. Norris, Bolton, both of Conn.

[73] Assignee: United Technologies Corporation, Hartford, Conn.

[21] Appl. No.: 691,920

[22] Filed: June 1, 1976

[51] Int. Cl.² .................................................. F04D 29/52
[52] U.S. Cl. .................................... 415/147; 415/9; 415/160; 403/225; 64/11 R
[58] Field of Search .......................... 415/160, 9, 147; 403/225, 226, 227, 229, 372; 64/11, 27

[56] References Cited

U.S. PATENT DOCUMENTS

| 2,061,985 | 11/1936 | Sauers | 403/226 |
| 2,842,305 | 7/1958 | Eckenfels et al. | 415/147 |
| 3,011,605 | 12/1961 | Hungerford et al. | 192/8 C |
| 3,303,992 | 2/1967 | Johnson | 415/160 |
| 3,685,920 | 8/1932 | Burge | 415/160 |

FOREIGN PATENT DOCUMENTS

| 1,575,538 | 1/1970 | Germany | 403/229 |
| 2,062,328 | 6/1971 | Germany | 415/147 |
| 762,883 | 12/1955 | United Kingdom | 415/147 |

*Primary Examiner*—C. J. Husar
*Attorney, Agent, or Firm*—Charles A. Warren

[57] ABSTRACT

In the connection between the unison ring and the actuating arms carried by the several vanes of a variable stator ring in an axial flow compressor and providing for turning the vanes as the unison ring is moved, the pivot that must permit angular misalignment, relative rotation and axial movement is an elliptical-shaped bushing mounted on either the ring or arm and engaging a cylindrical surface on the other of the ring or arm. The bushing is normally mounted on a pin and the cylindrical surface is provided by a sleeve, the elliptical element having slidable engagement with the sleeve. The bushing may be a metallic spring or may be made of an elastomer.

8 Claims, 2 Drawing Figures

CONNECTION BETWEEN VANE ARM AND UNISON RING IN VARIABLE AREA STATOR RING

BACKGROUND OF THE INVENTION

In a variable vane stator ring, the row of vanes is turned by a unison ring positioned in concentric relation to the stator ring and connected by actuating arms to each of the vanes, the latter being positioned for rotation about axes substantially radially of the stator ring. The arms are mounted on the stator vanes and their free ends have a pivotal connection with the unison ring. Since the movement of each of the arms occurs in a plane tangent to the unison ring, the connection between the arm and the unison ring must permit misalignment of the connection, and radial movement between the arm end and the ring, but having a minimum of side play between the arm and ring to assure a precision turning of the vanes. The frequent vane adjustment required during engine operation necessitates a durable connection that will perform adequately over a long period of time without significant wear. Many presently used constructions have designed therein a significant looseness to compensate for the necessary misalignment and radial movement within the connection with inevitable inaccuracies in the position of the vane for a selected location of the unison ring.

SUMMARY OF THE INVENTION

A feature of the invention is an elliptical or barrel shaped bearing surface on either the arm or ring engaging with a cylindrical surface on the other part so that the radial movement will be accommodated by sliding movement between the cooperating surfaces, and any misalignment will not create looseness because the elliptical shape will still assure engagement of the bearing surfaces in spite of the misalignment. Another feature is a resilience of the elliptical bearing surface to assure freedom of misalignment without binding. Another feature is an elliptical bearing surface in the form of an open coil spring secured at its end to the part carrying it.

According to the invention, each of the vanes which is pivotally mounted substantially on a radial axis in the supporting shrouds has an actuating arm at its outer end and the several arms are interconnected at their outer ends by a unison ring concentric to the shroud. The connection between each arm and the unison ring includes a sleeve on one of the parts providing a cylindrical substantially radially extending surface which is engaged by a barrel-shaped or elliptical bearing member or bushing on the other part. This shape permits sliding movement axially of the cylindrical surface and misalignment of the axis of the elliptical surface with the axis of the sleeve as is necessary to allow the necessary movement between arm and ring. It is desirable to make the elliptical bearing surface in the form of an open coil spring having the outer surface of each coil of the spring flattened to provide area contact with the cylindrical bearing surface.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
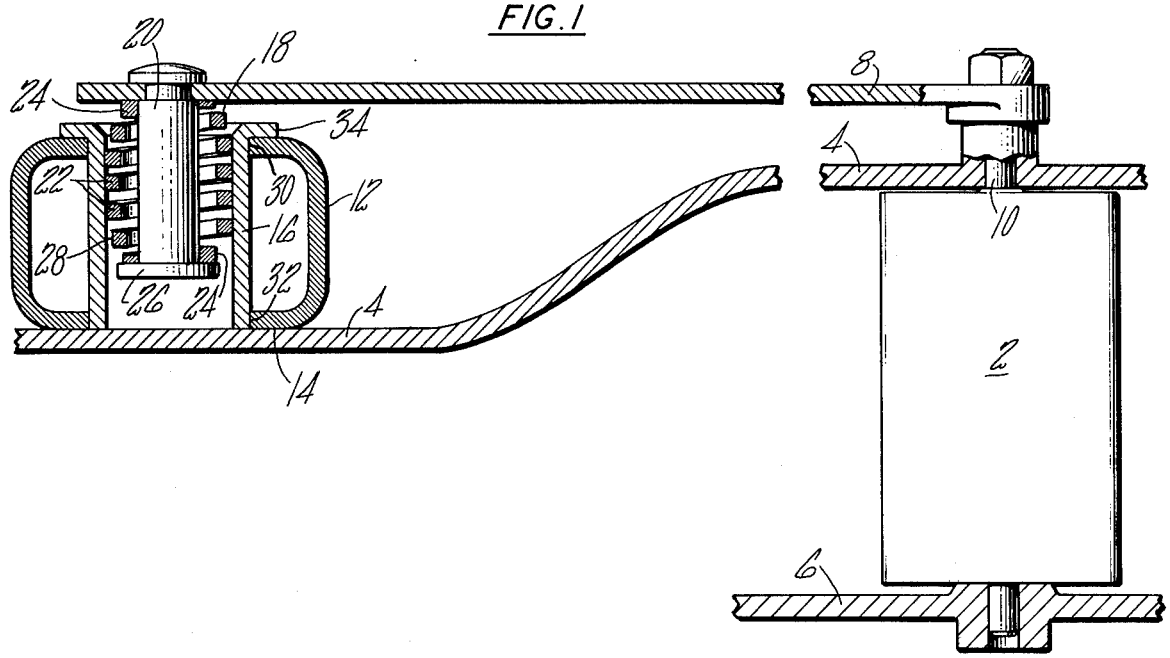
FIG. 1 is a fragmentary sectional view through a portion of a compressor showing a variable position vane and the actuating means.

In the arrangement shown, a row of vanes 2 making up a stator ring in a compressor, are arranged to have their position changed during engine operation to improve compressor operation. To this end the vane 2 is supported for turning in an outer casing or shroud ring 4 and an inner shroud ring 6, this pivotal movement of the vane being on a substantially radial axis. An actuating link or arm 8 is mounted on the outer end of a post 10 on the vane, and the free end of the arm 8, the end remote from the vane is engaged by a unison ring 12. This ring engages all of the arms on the vanes making up the row of vanes to assure unison movement of all the vanes. The ring is supported for circumferential and also axial movement on the periphery of the casing as by a cylindrical supporting surface 14 on the casing.

To permit the necessary relative movement between the end of the arm and the ring when the latter is moved circumferentially for adjusting the vanes the ring carries a plurality of integral sleeves 16, one for each arm. Each sleeve provides a cylindrical inner bearing surface and each sleeve is substantially radially in the ring. Cooperating with this bearing surface on the sleeve is an elliptical shaped bushing or bearing member 18 on the arm. A pin 20 fixed in the end of the arm and extending substantially parallel to the pivotal axis of the vane fits within the bearing member 18 to support it in position.

In the arrangement shown in FIG. 1, the bearing member 18 is a coil spring, the respective turns 22 of which are preferably out of contact with one another, and which has substantially an elliptical or barrel shape as shown. The end turns 24 of the coil are secured to or fit snugly on the pin 20 and the spring is desirably held axially on the pin between a head 26 on the pin and the arm as shown. The wire of the spring may be round as is conventional or may be flattened as shown so that the outer surface 28 of each turn is flat and parallel to the spring axis. This is most easily accomplished by making the spring of square wire as shown.

The unison ring is preferably a hollow sheet-metal ring formed into a rectangular cross section with rounded corners and the sleeves 16 are positioned in aligned holes 30 and 32 in outer and inner walls of the ring. The sleeve desirably carries a flange 34 at its outer end by which it may be welded, brazed, or otherwise bonded to the ring.

In operation, as the ring is moved circumferentially to turn the vanes, the arms are moved with it and as the arms move in a plane parallel to the ring the pins on the arms become more or less misaligned with the axes of the cooperating sleeve and the arm also moves toward or and away from the ring necessitating axial sliding of the bearing member 18 within the sleeve. The shape of the member permits this axial movement without diminishing its effectiveness, and because of the elliptical shape, the misalignment of the pin and sleeve does not cause any looseness in the bearing. The resilience of the spring permits adequate adjustment of the elliptical bearing to the cooperating sleeve to assure full circle contact between the bearing surfaces. The flat bearing surfaces on the spring assure long wear of the bearing without any looseness.

Figure 2:
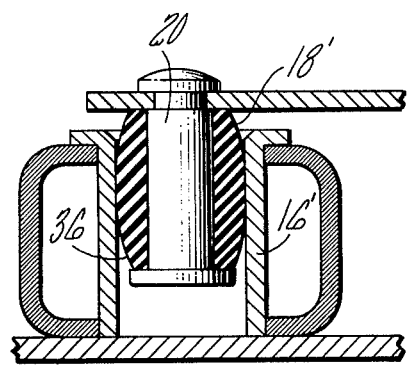
FIG. 2 is a similar view of a modification.

In the arrangement of FIG. 2, the elliptical bearing member 18' cooperating with the sleeve 16' is an elastomeric material functioning in the same way as the coil spring bearing member. The elastomer has the necessary barrel or elliptical shaped external surface 36 to form an adequate bearing surface and the resilience of the elastomer permits the slight deformation necessary to assure full circle contact between the elastomer and the surrounding sleeve 16' even when the supporting pin 20' is misaligned with the sleeve.

Either arrangement is simpler than the known bearing structures now in use and eliminates the multi-part structures presently found necessary. Particularly, there are no loose parts which produce excessive wear and require frequent replacements.

Although the invention has been shown and described with respect to a preferred embodiment thereof, it should be understood by those skilled in the art that other various changes and omissions in the form and detail thereof may be made therein without departing from the spirit and the scope of the invention.

Having thus decribed a typical embodiment of our invention, that which we claim as new and desire to secure by Letters Patent of the United States is:

1. In a variable vane stator structure,
   a row of vanes arranged in a ring,
   a shroud in which each of said vanes is pivoted for rotation about substantially a radial axis,
   a crank arm on each vane,
   an actuating ring for the row of vanes, said ring being connected to the ends of the crank arms remote from the vane, and
   connecting means between the ring and arm including
   a pin on said arm,
   a cooperating sleeve on the actuating ring surrounding and spaced from the pin, and
   an elliptical shaped resilient member in the form of a coil spring secured at its ends to the pin and engaging with and slidable in the sleeve on the ring.

2. A stator ring as in claim 1 in which the outer surface of the elliptical shaped member is a diameter to engage the sleeve and position the pin substantially centrally thereof.

3. A stator ring as in claim 1 in which the shape of the elliptical spring is such that as the pin is misaligned with the sleeve, the periphery of the spring will still be in engagement with the sleeve for substantially its full periphery.

4. For use in actuating a row of vanes in a variable stator, each of said vanes being mounted for turning on substantially a radial axis and each vane having an arm at one end by which the vane is turned, and an actuating unison ring engaging same arms for turning all said vanes in unison, the ring having a connection with the end of each arm remote from the vane, this connection including
   a pin on said arm,
   a sleeve carried by said ring and surrounding the pin in spaced relation thereto, and
   a compressible element in the form of a coil spring mounted on said pin and engaging the sleeve with sliding contact, the outer surface of the element being substantially elliptical-shape to permit angular misalignment of the pin in the sleeve.

5. A structure as in claim 4 in which the spring is made of wire of substantially square cross section with its ends secured to the pin.

6. In a variable stator row including
   an actuating ring,
   a stator ring,
   a row of stator vanes pivoted in said stator ring,
   an actuating arm mounted on each vane, and
   a unison ring substantially concentric to the stator ring and connected to each actuating ring;
   the combination of
   a pin on each arm at the end remote from the stator vane,
   a plurality of sleeves on the actuating ring, one for each pin, and each sleeve surrounding the associated pin in spaced relation thereto, and
   an elliptical-shaped resilient bushing on the pin and engaging slidably with the sleeve to position the pin therein.

7. A device as in claim 6 in which the resilient bushing is a coil spring having substantially an elliptical shape about the spring axis, said spring being secured at opposite ends to the pin and having a mid diameter to fit within and engage with the sleeve.

8. A device as in claim 7 in which the wire of the spring is substantially square in cross section.

* * * * *